United States Patent
Kokubu et al.

(10) Patent No.: US 6,335,499 B1
(45) Date of Patent: Jan. 1, 2002

(54) ASSEMBLY OF OPERATION KNOB AND CASING FOR SWITCH AND FABRICATION METHOD THEREOF

(75) Inventors: Hideki Kokubu; Umeo Arao; Shiro Esaki; Kentaro Hayashi, all of Aichi (JP)

(73) Assignee: Kabushiki Kaisha Tokai Kika Denki Seisakusho, Niwa-gun (JP)

( * ) Notice: Subject to any disclaimer, the term of this patent is extended or adjusted under 35 U.S.C. 154(b) by 0 days.

(21) Appl. No.: 09/646,507
(22) PCT Filed: Mar. 20, 1998
(86) PCT No.: PCT/JP98/01220
§ 371 Date: Nov. 29, 2000
§ 102(e) Date: Nov. 29, 2000
(87) PCT Pub. No.: WO99/49485
PCT Pub. Date: Sep. 30, 1999

(51) Int. Cl.$^7$ ............................................. H01H 13/00
(52) U.S. Cl. ...................... 200/341; 29/622; 200/345; 200/520
(58) Field of Search ...................... 29/622; 200/5 A, 200/512–517, 341–345, 520

(56) References Cited

U.S. PATENT DOCUMENTS

| 3,818,169 A | * | 6/1974 | Kobernus | .................. 200/159 A |
| 4,683,359 A | * | 7/1987 | Wojtanek | .................. 200/314 |
| 5,311,656 A | * | 5/1994 | Eldershaw | .................. 29/622 |
| 5,718,326 A | * | 2/1998 | Larose et al. | .................. 200/314 |
| 6,156,411 A | * | 12/2000 | Jennings | .................. 428/195 |

FOREIGN PATENT DOCUMENTS

| EP | 298873 | 1/1989 | ............ B29C/45/14 |
| JP | 54-28366 | 3/1979 | ............ A63H/9/00 |
| JP | 55-22912 | 2/1980 | |
| JP | 56-15333 | 2/1981 | ............ B29D/31/00 |
| JP | 63-49414 | 3/1988 | ............ B29C/45/14 |

* cited by examiner

Primary Examiner—Michael Friedhofer
(74) Attorney, Agent, or Firm—Morgan, Lewis & Bockius LLP

(57) ABSTRACT

Wobble caused between an operation knob and a casing for housing the operation knob is suppressed as small as possible due to the heat contraction at the time of a molding process. As a result, the operation knob can be downsized and so an assembly of the operation knob and the casing can be miniaturized as compared with the conventional ones. The operation knob and the casing for guiding the movement of the operation knob are formed by composite resins by using a dichroic molding method, and then the operation knob and the casing are separated after being molded to obtain an assembly. Due to the heat contraction at the time of the molding process, a necessary guide clearance is formed between the operation knob and the casing after the assembling of the operation knob and the casing. The operation knob is allowed to move due to the guide clearance.

7 Claims, 4 Drawing Sheets

ASSEMBLY OF OPERATION KNOB AND CASING FOR SWITCH AND FABRICATION METHOD THEREOF

TECHNICAL FIELD

The present invention relates to an assembly of an operation knob and a casing for a switch used in a push button switch, a slide switch etc. and a fabrication method thereof.

BACKGROUND ART

The conventional configuration of an assembly of an operation knob and a casing for a push button switch will be explained with reference to FIGS. 4 and 5. FIG. 4 is a sectional view in an exploded state and FIG. 5 is a sectional view in an assembled state.

As shown in FIG. 5, an operation knob 21 for a push button switch is disposed so as to be able to slide upward and downward with respect to a casing 22. The operation knob 21 is intended to be prevented from coming out of the casing 22 by means of a not-shown come-out preventing means. Supposing that the operation knob 21 and the casing 22 have the widths A and B as shown in FIG. 4, respectively, a guide clearance C (=B−A) necessary for sliding the operation knob freely is provided between the knob and the casing. When the operation knob 21 is pushed, a not-shown switch disposed beneath the operation knob 21 is turned on or off.

However, although the guide clearance is provided in order to slide the operation knob 21, the operation knob 21 wobbles after being assembled due to the guide clearance provided between the operation knob 21 and the casing 22 of the push button switch. This wobble is caused by the crossing of the parts, the leaves of the die etc. For example, in the prior art, such a guide clearance is 0.2 mm at the minimum. Conventionally, the length of the knob guide portion L of the operation knob 21 is made longer in order to reduce such a wobble by using the knob actually touched by a hand. As a result, the length of the casing 22 for housing the operation knob 21 also becomes longer and there arises a problem that the size of the push button switch becomes large.

DISCLOSURE OF THE INVENTION

The present invention has been made in order to obviate the aforesaid problem and an object of the invention is to provide an assembly of an operation knob and a casing for a switch and a fabrication method thereof which suppresses the wobble as small as possible by forming a guide clearance between the operation knob and the casing for housing the operation knob by using the heat contraction or heat shrinkage at the time of a molding process thereof so that the operation knob can be downsized and so the assembly of the operation knob and the casing can be miniaturized as compared with the conventional ones.

In order to attain the aforesaid object, the gist of the invention claimed resides in a method of fabricating an assembly of an operation knob and a casing for a switch which is characterized in that the operation knob and the casing for guiding movement of the operation knob are formed by a two-shot molding method by using composite resins, and the operation knob and the casing are separated from each other after being molded.

The gist of the invention further resides in the casing including a guide portion for guiding the operation knob, and a guide clearance being formed between the operation knob and the guide portion of the casing when the composite resins heat-contract at the time of the molding.

The gist of the invention further resides in a heat contraction ratio of the material forming the casing being larger than a heat contraction ratio of the material forming the operation knob.

The gist of the invention further resides in the operation knob being integrally formed with the casing after being assembled so that the operation knob closes an opening portion of the casing which is disposed to move freely, and then the operation knob and the casing are separated from each other.

The gist of the invention also resides in an assembly of an operation knob and a casing for a switch which is arranged in a manner that the operation knob and the casing for guiding movement of the operation knob are formed by a two-shot molding method by using composite resins, and the operation knob and the casing are separated from each other after being molded.

The gist of the invention further resides in the casing including a guide portion for guiding the operation knob, and a guide clearance being formed between the operation knob and the guide portion of the casing when the composite resins heat-contract at the time of the molding.

The gist of the invention further resides in a heat contraction ratio of the material forming the casing being larger than a heat contraction ratio of the material forming the operation knob.

Thus, according to the invention recited, the operation knob and the casing for guiding movement of the operation knob are formed by the two-shot molding method by using the composite resins of the same material or different materials, and the operation knob and the casing are separated from each other after being molded.

Additionally, according to the invention recited, after the assembling process, the guide clearance can be formed between the operation knob and the guide portion of the casing due to the heat contraction of the composite resins at the time of the molding. Thus, the guide clearance can allow the operation knob to move smoothly when the operation knob is operated.

Additionally, according to the invention recited, since the heat contraction ratio of the material forming the casing is larger than that of the material forming the operation knob, the guide clearance used at the time of moving the operation knob can be formed due to the difference of the heat contraction ratios therebetween.

Additionally, according to the invention recited, the operation knob is integrally formed with the casing after being assembled so that the operation knob closes the opening portion of the casing which is disposed to move freely, and thereafter the operation knob and the casing are separated from each other.

Additionally, according to the invention recited, due to the heat contraction caused at the time of forming the operation knob and the casing for guiding the operation knob by the composite resins by using the two-shot molding process, the necessary guide clearance is formed between the operation knob and the casing after being assembled. The guide clearance allows the operation knob to move.

Additionally, according to the invention recited, the guide clearance is formed due to the heat contraction between the operation knob and the guide portion of the casing and so the operation knob can be allowed to move.

Additionally, according to the invention recited, since the heat contraction ratio of the material forming the casing is larger that that of the material forming the operation knob, the functions described above can be obtained.

BEST MODE FOR CARRYING OUT THE INVENTION

An embodiment which is realized by applying the invention to an assembly K of an operation knob and a casing for a push button switch will be explained with reference to FIGS. 1 to 3.

Figure 1A:
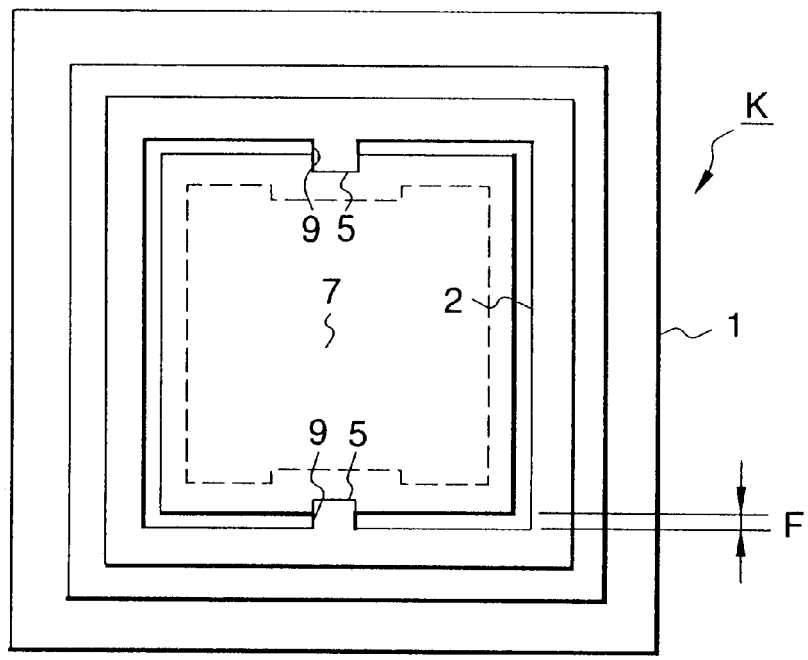
FIGS. 1(a) and 1(b) are a plan view and a sectional view showing an assembly according to an embodiment of the invention, respectively.
Figure 1B:
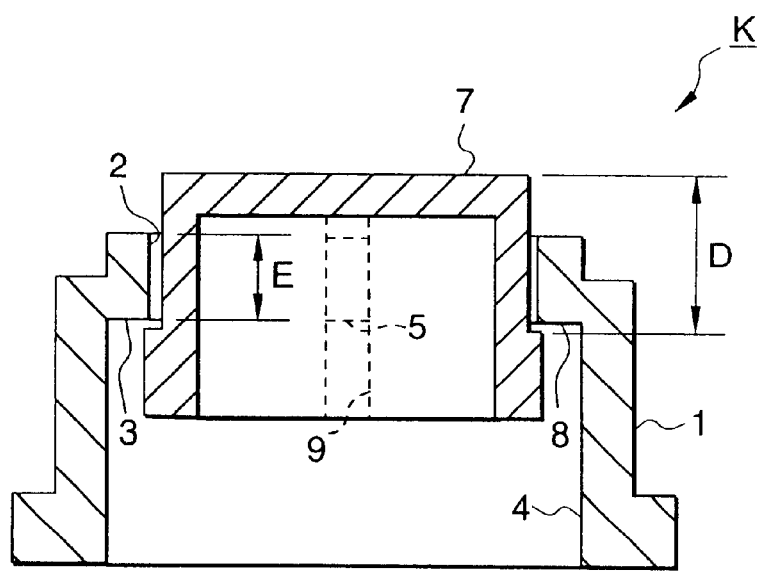

FIG. 1(a) is a plan view of the assembly K and FIG. 1(b) is a sectional view thereof.

As shows in FIG. 1(a), the casing 1 is formed in an almost rectangular cylindrical shape by polyacetal as composite resin. The upper opening portion 2 of the casing 1 is formed so as to be contracted in size and a step portion 3 is formed at the inner periphery of the upper opening portion 2. A housing chamber 4 communicating with the upper opening portion 2 is formed within the casing 1. The casing 1 is placed and fixed on a not-shown circuit board and covers a switching member (not shown) of a push button type on the circuit board. The upper opening portion 2 is formed in a rectangular shape in its section and provided with projections 5 extending upward/downward at the center portions of the opposing inner surfaces.

An operation knob 7 disposed within the casing 1 is formed in a rectangular box shape with a lid. The operation knob 7 is formed by an ABS resin whose heat contraction ratio upon molding is smaller than that of the polyacetal of the casing 1 (that is, a heat contraction ratio of the polyacetal is larger than that of the ABS resin). The lower portion of the operation knob 7 is slightly expanded through the step portion 8. The outer configuration of the lower portion of the operation knob 7 is same as the inner configuration of the upper opening portion of the casing 1. In the operation knob 7, the length D of the upper portion except for the step portion 8 is larger than the length E in the upward/downward direction of the upper opening portion 2 of the casing 1. Guide grooves 9 of concave shapes are provided, on the outer side surfaces of the operation knob 7 opposed to each other by 180 degrees, at the positions opposing to the projections 5 of the upper opening portion 2 so that the projections 5 are fitted in the guide grooves so as to slide freely, respectively. Thus, the operation knob 7 is guided by the projections 5 to freely move upward/downward with respect to the casing 1. The allowable movable distance of the operation knob is set to the length D from the upper surface of the operation knob 7 to the step portion 8. The projections 5 constitute a guide portion.

In FIG. 1(b), between the upper outer side surface of the portion 7 except for the step portion 8 and the inner side surface of the upper opening portion 2, a clearance F is formed except for the sliding portion between the projections 5 and the guide grooves 9.

Then, the method of fabricating the aforesaid assembly K will be explained.

Figure 3A:
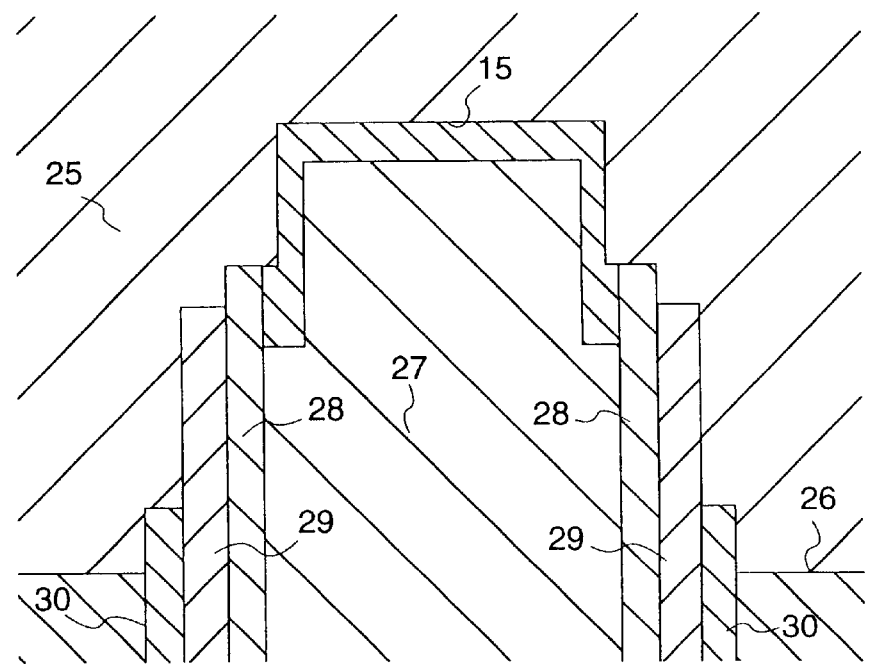
FIGS. 3(a) and 3(b) are sectional views showing a die at the time of molding according to the invention.
Figure 3B:
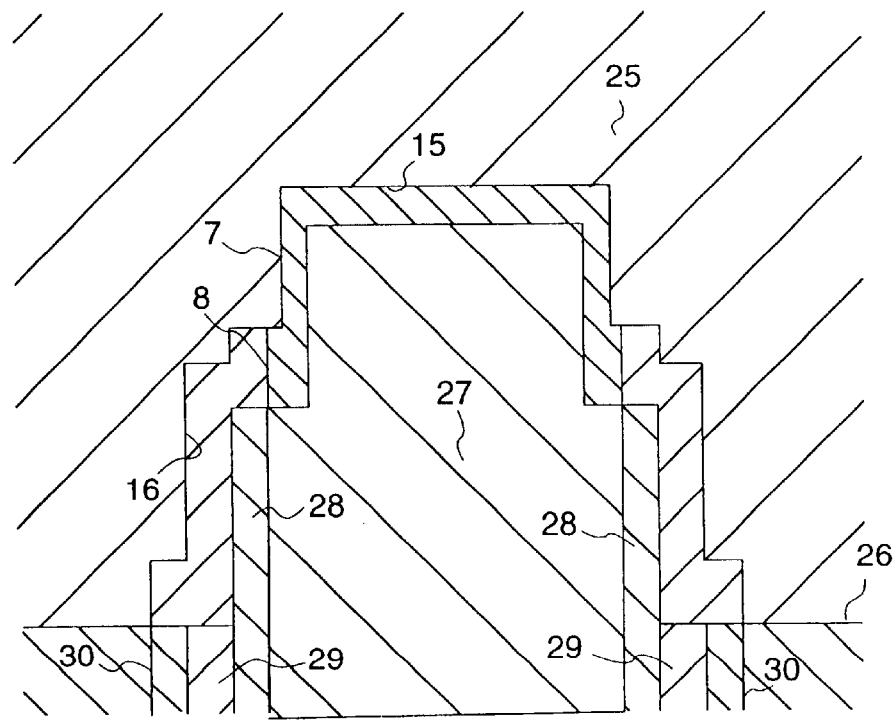
Figure 4:
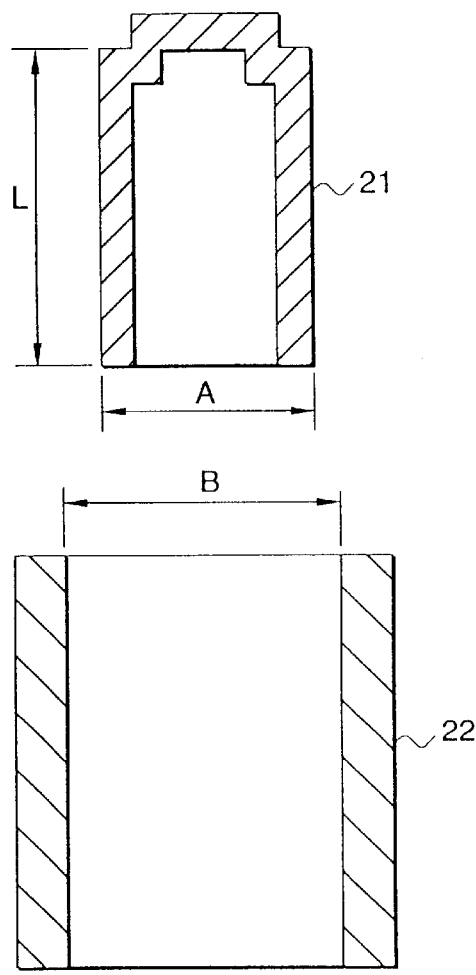
FIG. 4 is an exploded sectional view of a conventional assembly.
Figure 5:
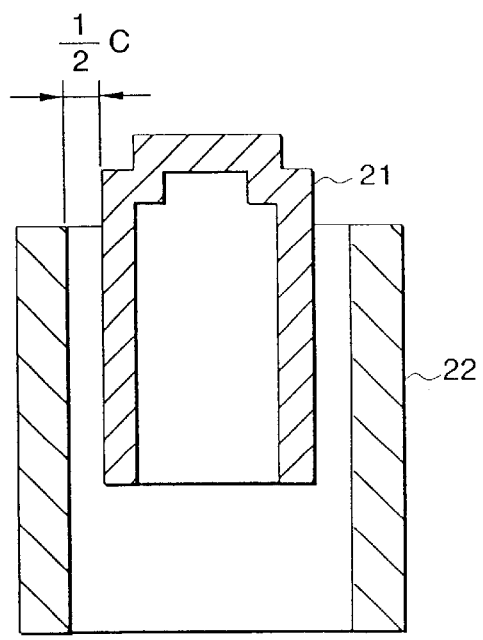
FIG. 5 is a sectional view of the conventional assembly.

FIGS. 3(a) and 3(b) are sectional diagrams of a die in the embodiment.

As shown in FIG. 3(a), the die is constituted by an upper die 25, a lower die 26, a core 27 and first to third slide cores 28 to 30 etc.

FIG. 3(a) shows the sectional view within the die at the time of forming the operation knob 7. Each of the slide cores 28 to 30 are disposed at the positions for the operation knob forming process. As shown in this figure, a first cavity 15 surrounded by the upper die 25, the core 27 and the first slide core 28 is formed. The space configuration of the first cavity 15 is set to the three-dimensional configuration of the operation knob 7 after being separated as shown in FIG. 1(b). In this state, the heated and melted ABS resin is injected from a not-shown gate and filled within the first cavity 15.

Then, after the melded ABS resin is hardened, the first to third slide cores 28 to 30 are moved from the position shown in FIG. 3(a) to the position shown in FIG. 3(b). In this state, the space surrounded by the outer side surface of the step portion 8 of the operation knob 7 formed by the hardened ABS resin, the upper die 25, the first slide core 28, the second slide core 29 and the third slide core 30 forms a second cavity 16. The space configuration of the second cavity 16 is set to the three-dimensional configuration of the casing 1 after being separated as shown in FIG. 1(b). In this state, the heated and melted polyacetal resin is injected from a not-shown gate and filled within the second cavity 16.

Figure 2A:
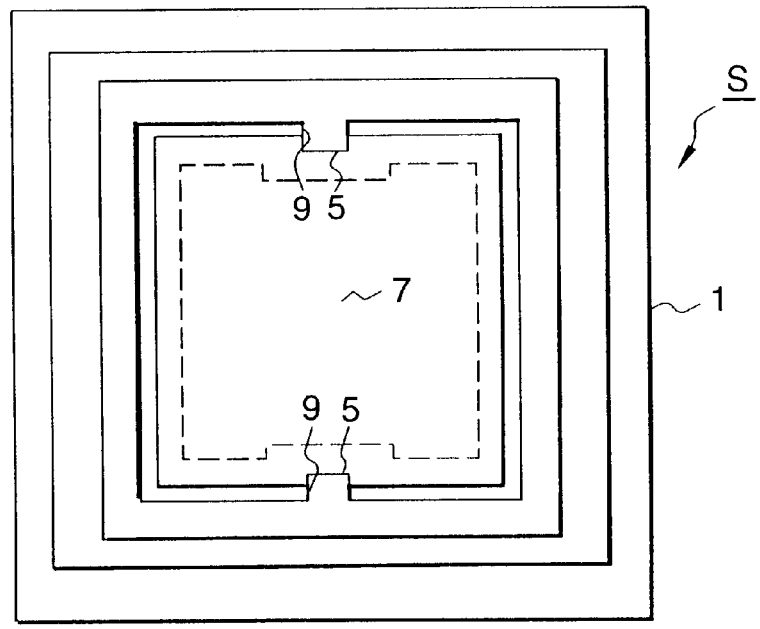
FIGS. 2(a) and 2(b) are a plan view and a sectional view showing the assembly at the time of molding according to the embodiment of the invention, respectively.
Figure 2B:
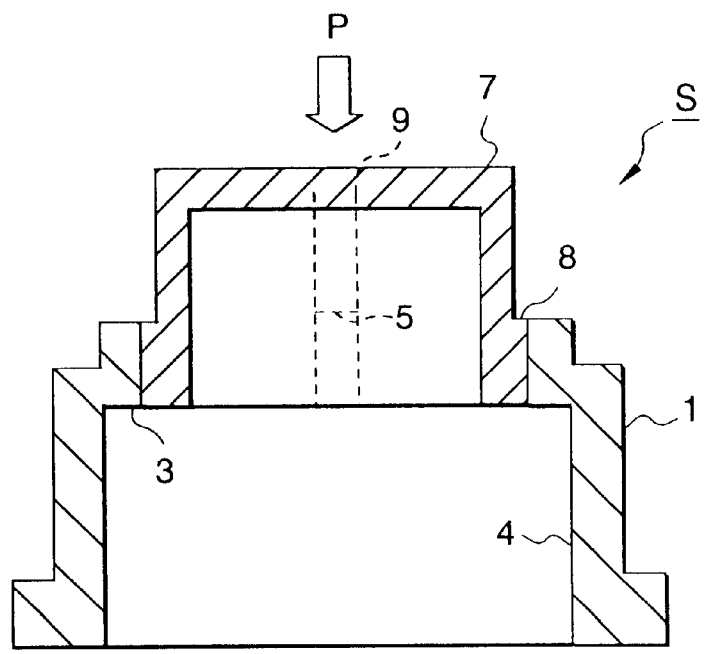

In the state where the polyacetal resin is sufficiently hardened, the dies are opened to obtain a molded product S shown in FIGS. 2(a) and 2(b). Since the portions where the polyacetal resin contacts with the ABS resin are fused and bonded to each other, the inner side wall of the upper opening portion 2 of the casing 1 and the outer side surface of the step portion 8 of the operation knob 7 are integrally combined and so the operation knob 7 and the casing 1 are formed in an integrated manner. In other words, in the state of this molded product S, the upper opening portion 2 of the casing 1 is not formed yet and closed by the operation knob 7. FIG. 2(a) is a plan view of the molded product S and FIG. 2(b) is a sectional view thereof.

In the aforesaid manner, the molded product S is formed by the dichroic molding method (co-injection molding).

When the molded product S is pushed in a direction shown by an arrow P as shown in FIG. 2(b), the adhesion state between the operation knob 7 and the casing 1 is broken, and the operation knob 7 and the casing 1 are separated to each other. Since the molded product is pushed in the direction P and separated as described above, the molded product after being separated constitutes the assembly K as it is.

Although the outer side surface of the step portion 8 of the operation knob 7 is configured as a broken surface, since the outer side surface thereof is always disposed within the housing chamber 4 of the casing 1, the outer side surface can not be viewed from the outside. Further, since the broken surfaces at the guide grooves 9 of the operation knob 7 are always disposed-within the housing chamber 4 as shown in FIG. 1(b) and the sliding operation of the operation knob 7 with the projections 5 is performed at the portion above the step portion 8, the operability is not degraded.

The fabricating method of the assembly K configured in this manner and the effects of the assembly K will be described.

(1) The molded product S thus formed thermally contracts when the resins harden. In this respect, the contraction ratio of the casing 1 formed by the polyacetal resin is larger than that of the operation knob 7 formed by the ABS resin. As a result, since the degree of the contraction of the outer configuration of the projections 5 of the casing 1 is larger than that of the outer configuration of the guide grooves 9 of the operation knob 7, when the casing and the operation knob are assembled and fitted to each other after the separation process, the guide clearance is formed due to the difference of the heat contraction ratios between the casing and the operation knob. The guide clearance is smaller than the clearance F shown in FIG. 1(*a*). Thus, the operation knob 7 and the casing 1 are operated while maintaining the fitting state between the projections 5 and the guide grooves 9. Since the guide clearance is obtained from the difference between the heat contraction ratios, a minute guide clearance can be obtained.

The inventor confirmed that the actual product with the guide clearance of 0.02 mm was obtained. Since the conventional guide clearance is about 0.2 mm at the minimum, the guide clearance according to the invention differs from the conventional ones by about one digit.

(2) The portion where a sliding resistance is generated at the operation knob 7 is only the sliding portion between the projections 5 and the guide grooves 9, and the operation knob does not contact and slide with any other portions, there arises no wobble.

(3) In view of the aforesaid matter, unlike the prior art, since it is not necessary to make the operation knob longer in order to eliminate the wobble, the length of the operation knob 7 can be made short and so the size of the casing 1 itself can be made sufficiently small. Accordingly, the assembly K can be downsized. The inventor confirmed that when the assembly is formed by the same method as the prior art, in order to prevent the wobble to the same degree as the embodiment, the length D is required to be five times as that of the invention.

(4) In this embodiment, although the outer side surface of the step portion 8 of the operation knob 7 is configured as the broken surface, since the outer side surface thereof is always disposed within the housing chamber 4 of the casing 1, the outer side surface can not be viewed from the outside. Further, since the broken surfaces at the guide grooves 9 of the operation knob 7 are always disposed within the housing chamber 4 as shown in FIG. 1(*b*) and the sliding operation of the operation knob 7 with the projections 5 is performed at the portion above the step portion 8, the operability is not degraded.

The embodiment of the invention is not limited to the aforesaid embodiment and may be modified and realized in the following manner.

(1) Although in the aforesaid embodiment, the operation knob 7 and the casing 1 are formed by the ABS resin and the polyacetal resin, respectively, the materials thereof are not limited to those of the embodiment as long as both the operation knob and the casing are fused and bonded to each other at the combining portions thereof in the dichroic molding process and the heat contraction ratio of one of the operation knob and the casing is small.

(2) Although in the aforesaid embodiment, the molded product is formed by the dichroic molding method, the molded product may be formed by using the composite resins of the same material by the two-shot molding method. In this case, although the same material is used, the material is required to have such a nature that the resin having been ejected and hardened formerly and the resin ejected later are fused and bonded to each other. The two-shot molding method in the invention is intended to include not only the dichroic molding method in the aforesaid embodiment but also the method in which the same material is ejected and molded in two stages.

(3) Although in the aforesaid embodiment, the guide grooves 9 are provided on the operation knob 7 side and the projections 5 are provided on the casing 1 side, the projections 5 may be provided on the operation knob 7 side and the guide grooves 9 may be provided on the casing 1 side. In this case, it is preferable to set the heat contraction ratio of the composite resin of the operation knob 7 side to be larger than that of the composite resin of the casing 1 side.

(4) Although in the aforesaid embodiment, the assembly constituted by the operation knob 7 and the casing 1 for a push button is formed, the invention may be realized in an assembly constituted by an operation knob and a casing for a slide switch.

(5) Alternatively, the guide grooves and the projections may be eliminated and the upper opening portion 2 of the casing 1 may be used as the guide portion.

Then, the technical concept other than the invention recited in claims which can be grasped from the aforesaid embodiment will be described together with the effects thereof.

(1) The fabrication method of the assembly of the operation knob and the casing for a switch recited in claim 3 is arranged in a manner that the operation knob is provided with the guide-grooves and the casing is provided with the projections fitting to the guide grooves. According to such an arrangement, at the time of the molding, since the degree of heat contraction of the guide projections is larger than that of the guide grooves, the guide clearance can be formed easily.

(2) The assembly of the operation knob and the casing for a switch recited in claim 6 is arranged in a manner that the operation knob is provided with the guide grooves and the casing is provided with the projections fitting to the guide grooves. According to such an arrangement, at the time of the molding, since the degree of heat contraction of the guide projections is larger than that of the guide grooves, the small guide clearance can be formed.

According to the invention recited in claim 1, after the assembling process, the guide clearance can be formed between the operation knob and the casing for housing the operation knob due to the heat contraction at the time of the molding. As a result, the wobble can be suppressed as small as possible, and the operation knob can be downsized and so the assembly of the operation knob and the casing can be miniaturized as compared with the conventional ones.

According to the invention recited in claim 2, after the assembling process, the guide clearance can be formed between the operation knob and the guide portion of the casing due to the heat contraction of the composite resins at the time of the molding. Thus, the guide clearance can allow the operation knob to move smoothly when the operation knob is operated.

According to the invention recited in claim 3, since the heat contraction ratio of the material forming the casing is larger than that of the material forming the operation knob, the guide clearance used at the time of moving the operation knob can be formed due to the difference of the heat contraction ratios therebetween.

According to the invention recited in claim 4, the operation knob is integrally formed with the casing after being assembled so that the operation knob closes the opening portion of the casing which is disposed to move freely. Thus, thereafter, when the operation knob and the casing are separated to each other and the operation knob is assembled within the opening portion of the casing, the fine guide clearance can be formed easily between the casing and the operation knob.

According to the invention recited in claim 5, the wobble can be suppressed as small as possible, and the operation knob can be downsized and so the assembly can be miniaturized as compared with the conventional ones.

According to the invention recited in claim 6, in addition to the effect of claim 5, the guide clearance is formed due to the heat contraction between the operation knob and the guide portion of the casing and so the operation knob can be allowed to move.

According to the invention recited in claim 7, since the heat contraction ratio of the material forming the casing is larger than that of the material forming the operation knob, the effects of claims 5 and 6 can be obtained.

What is claimed is:

1. A method of fabricating an assembly of an operation knob and a casing for a switch is characterized in that said operation knob and said casing for guiding movement of said operation knob are formed by a two-shot molding method by using composite resins of same material or different materials, and said operation knob and said casing are separated from each other after being molded.

2. A method of fabricating an assembly of an operation knob and a casing for a switch according to claim 1 is characterized in that said casing includes a guide portion for guiding said operation knob, and a guide clearance is formed between said operation knob and said guide portion of said casing when said composite resins heat-contract at the time of the molding.

3. A method of fabricating an assembly of an operation knob and a casing for a switch according to claim 1 or 2 is characterized in that a heat contraction ratio of material forming said casing is larger than a heat contraction ratio of material forming said operation knob.

4. A method of fabricating an assembly of an operation knob and a casing for a switch according to claim 1 or claim 2 is characterized in that said operation knob is integrally formed with said casing after being assembled so that said operation knob closes an opening portion of said casing and is disposed to move freely, and then said operation knob and said casing are separated from each other.

5. An assembly of an operation knob and a casing for a switch is characterized in that said operation knob and said casing for guiding movement of said operation knob are formed by a two-shot molding method by using composite resins of same material or different materials, and said operation knob and said casing are separated from each other after being molded.

6. An assembly of an operation knob and a casing for a switch according to claim 5 is characterized in that said casing includes a guide portion for guiding said operation knob, and a guide clearance is formed between said operation knob and said casing when said composite resins heat-contract at the time of the molding.

7. An assembly of an operation knob and a casing for a switch according to claim 5 is characterized in that a heat contraction ratio of material forming said casing is larger than a heat contraction ratio of material forming said operation knob.

* * * * *